(12) United States Patent
Nakao et al.

(10) Patent No.: US 8,297,678 B2
(45) Date of Patent: Oct. 30, 2012

(54) RETRACTABLE SEAT FOR VEHICLE

(75) Inventors: Tomohiro Nakao, Anjo (JP); Tatsuya Kato, Miyoshi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 179 days.

(21) Appl. No.: 12/872,210

(22) Filed: Aug. 31, 2010

(65) Prior Publication Data

US 2011/0080027 A1  Apr. 7, 2011

(30) Foreign Application Priority Data

Oct. 1, 2009  (JP) ................................. 2009-229478

(51) Int. Cl.
*B60N 2/36* (2006.01)
(52) U.S. Cl. ...................................... 296/65.09; 297/15
(58) Field of Classification Search .................... 297/15, 297/331, 334–336; 296/65.09
See application file for complete search history.

(56) References Cited

U.S. PATENT DOCUMENTS

| | | | | |
|---|---|---|---|---|
| 6,644,730 B2* | 11/2003 | Sugiura et al. | .................. | 297/15 |
| 7,273,243 B2* | 9/2007 | Prugarewicz | .............. | 296/65.09 |
| 7,377,582 B2* | 5/2008 | Fukada et al. | .................. | 297/15 |
| 7,717,489 B2* | 5/2010 | Mitsuhashi | ................ | 296/65.09 |
| 7,828,358 B2 | 11/2010 | Mitsuhashi | | |
| 8,052,194 B2* | 11/2011 | Sayama | ........................... | 297/15 |
| 8,123,272 B2* | 2/2012 | Ito et al. | ..................... | 296/65.09 |
| 2008/0042472 A1* | 2/2008 | Holdampf et al. | ............... | 297/15 |
| 2010/0007167 A1 | 1/2010 | Ito et al. | | |
| 2010/0052370 A1* | 3/2010 | Fujisawa et al. | ................ | 297/15 |

FOREIGN PATENT DOCUMENTS

JP  2008-062740  3/2008

* cited by examiner

*Primary Examiner* — Peter R. Brown
(74) *Attorney, Agent, or Firm* — Greenblum & Bernstein, P.L.C.

(57) ABSTRACT

A retractable seat for a vehicle includes: a first leg with a proximal end that is rotatably attached to a seat cushion and a distal end that is rotatably attached to a floor; a second leg that is rotatably attached to the seat cushion; and an interlocking member that couples the first leg to the second leg so that the second leg is move in accordance with movement of the first leg. Rotating the first leg with respect to the floor moves the seat cushion from a use position to a retracted position. The rotation of the second leg through the interlocking member, from a position at which a second leg stands upright with respect to the seat cushion to a position which the second leg extends along the seat cushion.

2 Claims, 6 Drawing Sheets

RETRACTABLE SEAT FOR VEHICLE

INCORPORATION BY REFERENCE

The disclosure of Japanese Patent Application No. 2009-229478 filed on Oct. 1, 2009 including the specification, drawings and abstract is incorporated herein by reference in its entirety.

BACKGROUND OF THE INVENTION

1. Field of the Invention

The present invention relates to a retractable seat for a vehicle.

2. Description of the Related Art

Japanese Patent Application Publication No. 2008-62740 describes a conventional retractable seat that includes a seat back rotatably attached to a seat cushion, and a reclining device that locks the seat back in position with respect to the seat cushion. A rear leg that rotatably couples the seat cushion to the floor is provided at the lower rear portion of the seat cushion. A front leg that rotatably couples the seat cushion to the floor is attached to the lower front portion of the seat cushion. An interlocking member that couples the front leg and the fear leg so that the second leg is moved in accordance with movement of the first leg is provided between the front leg and the rear leg.

When the rear leg rotates rearward, the seat cushion moves rearward to its retracted position. Then, the front leg is rotated counterclockwise through the interlocking member from a use position to a position at which the front leg extends along the seat cushion. A cable that releases the reclining device is coupled to the upper end of the front leg. The cable is pulled by rotating the front leg with respect to the seat cushion to unlock the reclining device. This allows the seat back to be folded over the seat cushion.

However, the stroke amount by which the front leg pulls the cable is affected by the rotation amount of the front leg with respect to the seat cushion. The rotation amount of the front leg is affected by the amount of movement of the interlocking member, which rotates the front leg, and the amount of rotation of the rear leg, which moves the interlocking member. Therefore, the stroke amount of the cable is affected by variations in size of the rear leg, the interlocking member, and the front leg and variations in assembled position of such components. Therefore, the stroke amount of the cable is occasionally insufficient for the cable to unlock the reclining device.

SUMMARY OF THE INVENTION

The present invention provides a retractable seat for a vehicle in which a reclining device is reliably released when a seat cushion is moved to its retracted position.

An aspect of the present invention provides a retractable vehicle seat that includes: a seat back that is rotatably attached to a seat cushion; a reclining device that locks the position of seat back with respect to the seat cushion; a first leg with a proximal end rotatably attached to the seat cushion and the distal end rotatably attached to the vehicle body; a second leg that is rotatably attached to the seat cushion; an interlocking member that couples the first leg to the second leg so that the second leg is moved in accordance with movement of the first leg; and a release device that is provided at the proximal end of the first leg to unlock the reclining device. Rotating the first leg with respect to the vehicle body moves the seat cushion from a use position to a retracted position, and rotates the second leg, via the interlocking member, from an upright with respect to the seat cushion to a position in which the second leg extends along the seat cushion. The release device pulls a cable to unlock the reclining device when the release device detects rotation of the first leg with respect to the seat cushion.

Thus, the release device pulls the cable in accordance with the amount of rotation of the first leg with respect to the seat cushion not via the interlocking member or the second leg. Therefore, the release device reliably releases the reclining device via the cable without being affected by variations in size of the interlocking member and the second leg or variations in assembled position of such components. In addition, because the release device is provided at the proximal end of the first leg, the release device may be located nearer the reclining device than when the release device is provided at the distal end. Therefore, the length of the cable used to couple the release device and the reclining device may be reduced.

In the above aspect, the release device may include a cam that is secured to the proximal end of the first leg. The cam is formed with a curved surface that curves the cable when the first leg is rotated with respect to the seat cushion. Thus, when the first leg is rotated with respect to the seat cushion, the cam curves the cable. This allows the release device to pull the cable by a stroke amount increased by the curved surface of the cam. In this way, the reclining device can be reliably unlocked.

In the above aspect, the retractable vehicle seat may further include a restriction device that is provided between the release device and the reclining device to restrict a stroke amount of a cable which pulls a release lever for the reclining device. Thus, the release lever may be prevented from being pulled excessively, which reduces the possibility of damage to the reclining device and so forth.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
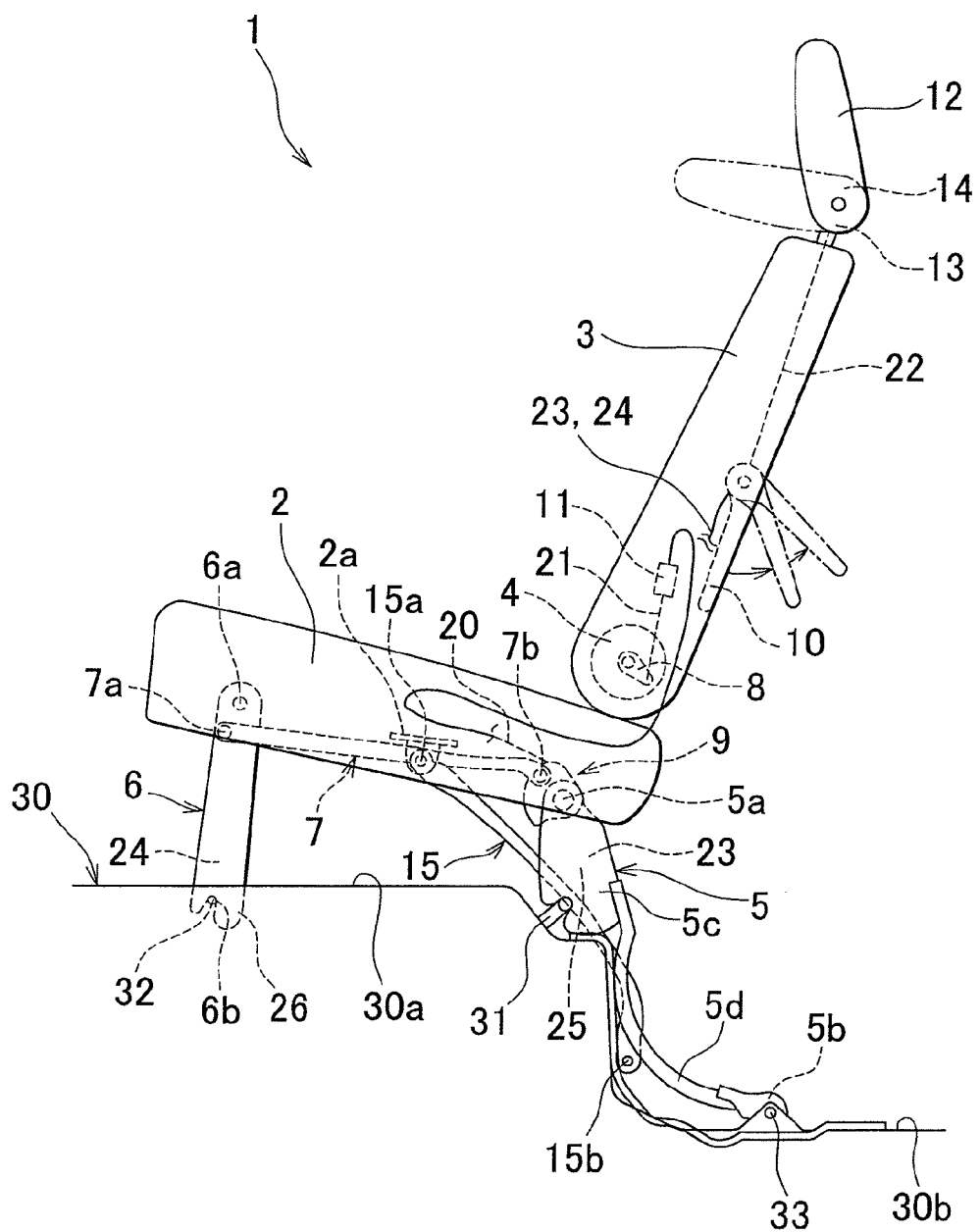
FIG. 1 is a left side view of a seat in a use position.

An embodiment of the present invention will be described with reference to FIGS. 1 to 6. A retractable seat 1 is attached to the floor 30 of a vehicle. From a use position that allows an individual to sit on the seat, shown in FIG. 1, the seat may be folded to a retracted position, shown in FIG. 3. The seat 1 includes a seat cushion 2, a seat back 3, and a head rest 12. The seat back 3 is rotatably attached to the rear portion of the seat cushion 2. Reclining devices 4 that lock the seat back 3 into various positions with respect to the seat cushion 2 are provided between the seat back 3 and the seat cushion 2.

As shown in FIG. 1, the head rest 12 is rotatably attached to the upper portion of the seat back 3. The head rest 12 includes a locking device 13 and an urging member 14. The locking device 13 locks the head rest 12 with respect to the seat back 3 at a use position indicated by the solid line in FIG. 1. The urging member 14 urges the head rest 12 forward to rotate the head rest 12 forward when the locking device 13 is unlocked.

As shown in FIG. 1, a pair of first legs (rear legs) 5 are provided at the rear of the seat cushion 2. A pair of second legs (front legs) 6 are provided at the front of the seat cushion 2. The rear legs 5 includes a main body portion 5c and a guide link 5d that extends from the main body portion 5c. The main body portion 5c is secured to the guide link 5d. The upper end of the main body portion 5c, that is, a proximal end 5a of the first leg 5, is rotatably attached to the seat cushion 2. A first locking device 25 is provided at the lower end of the main body portion 5c. The first locking device 25 may be engaged with an anchor 31 that is provided on the floor 30.

Figure 3:
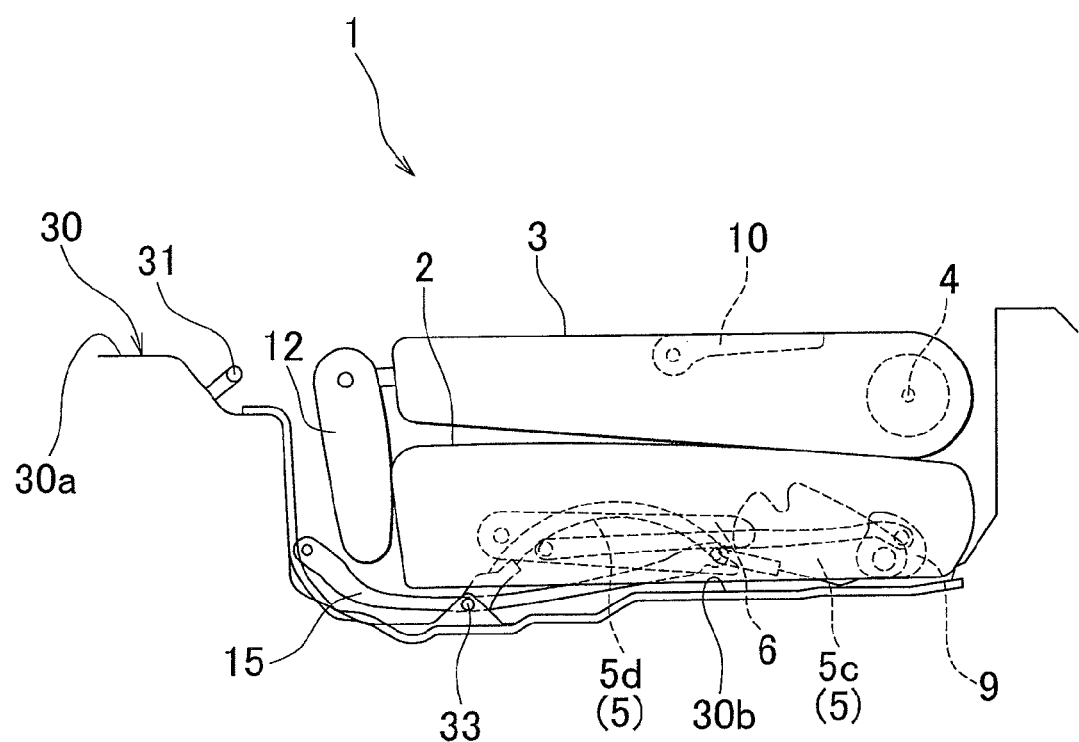
FIG. 3 is a left side view of the seat when retracted position.

As shown in FIGS. 1 and 3, the floor 30 includes a base portion 30a and a recessed portion 30b. The recessed portion 30b is a recess that is provided behind the base portion 30a. The anchor 31 is provided at the rear of the base portion 30a. A bracket 33 is attached to the bottom surface of the recessed portion 30b. The distal end of the guide link 5d, that is, a second end 5b of the first leg 5, is rotatably attached to the bracket 33.

As shown in FIG. 1, a proximal end 6a of the second leg 6 is rotatably attached to the lower front portion of the seat cushion 2. A second locking device 26 that may be engaged with an anchor 32 provided on the floor 30 is provided at a distal end 6b of the second leg 6. An interlocking member (coupling link) 7 is provided between the front leg 5 and the rear leg 6. The second leg 6A is moved in accordance with movement of the first leg 5 by the interlock member 7. The front end 7a of the interlocking member 7 is rotatably attached to a portion of the second leg 6 near the proximal end 6a. A rear end 7b of the interlocking member 7 is rotatably attached to the upper proximal end of the first leg 5, above the location where the first leg 5 is coupled to the seat cushion 2.

As shown in FIG. 1, an auxiliary link 15 is provided between the seat cushion 2 and the floor 30. A proximal end 15a of the auxiliary link 15 is rotatably attached to the seat cushion 2 at a location between the first leg 5 and the second leg 6 (Incidentally, the bracket 2a is a portion of the seat cushion 2). A distal end 15b of the auxiliary link 15 is rotatably attached to the front wall surface of the recessed portion 30b of the floor 30. Thus, the seat cushion 2 can be moved generally in parallel by the auxiliary link 15 and the first legs 5 from a use position shown in FIG. 1 to a retracted position shown in FIG. 3.

As shown in FIG. 1, an operation lever 10 that is operated to switch the seat 1 from the use position to the retracted position is rotatably attached to the back surface of the seat back 3. A cable 22 that extends from the locking device 13 is coupled to the operation lever 10. When the lower end of the operation lever 10 is brought up to a first position, the operation lever 10 pulls the cable 22, thereby unlocking the locking device 13. Therefore, the head rest 12 is rotated forward through the urging member 14.

As shown in FIG. 1, cables 23 and 24 that extend from the locking devices 25 and 26 are also coupled to the operation lever 10. If the lower end of the operation lever 10 is brought up from the first position to a second position, the operation lever 10 pulls the cables 23 and 24, thereby unlocking locking devices 25 and 26. This allows the second legs 6 to be disengaged from the floor 30 and also allows the first legs 5 to rotate with respect to the floor 30.

Figure 4:
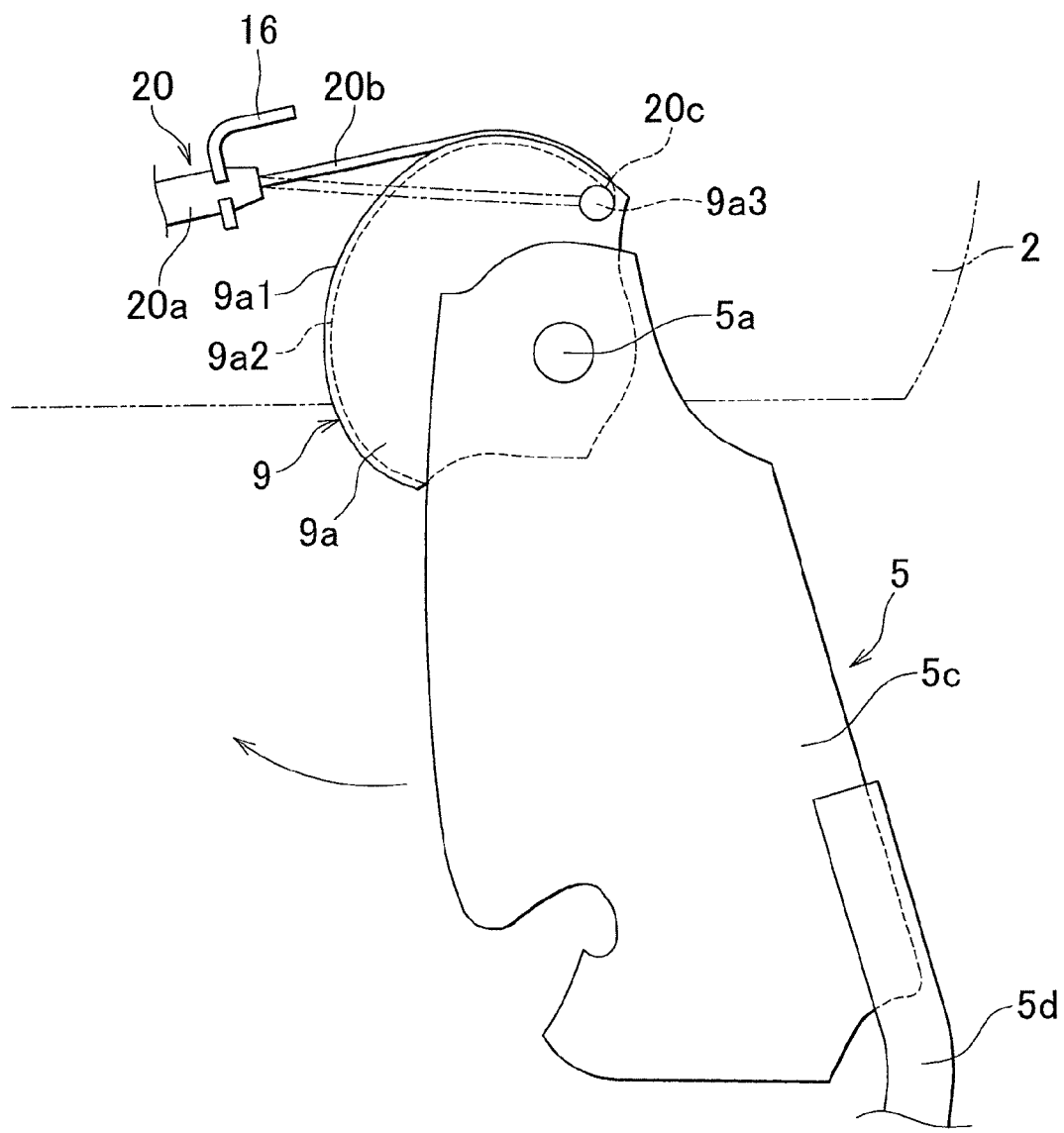
FIG. 4 is a partial left side view showing a portion of the seat around a release device.

As shown in FIG. 1, a release device 9 and cables 20 and 21 are provided between the first leg 5 and the reclining device 4. As shown in FIG. 4, the release device 9 pulls the cable 20 when the release device 9 detects the rotation of the first leg 5 with respect to the seat cushion 2, and includes a cam 9a. The cam 9a is attached to the proximal end 5a of the first leg 5 so that the cam 9a cannot rotate with respect to the proximal end 5a of the first leg 5. A curved surface 9a1 is formed on the outer peripheral surface of the cam 9a. A groove 9a2 and an engagement recess 9a3 are formed in the curved surface 9a1. An end 20c of an inner cable 20b of the cable 20 is engaged with the engagement recess 9a3. The inner cable 20b is placed in the groove 9a2.

As shown in FIG. 4, a portion of the curved surface 9a1 of the cam 9a that contacts the inner cable 20b when the first leg 5 is rotated is protruded toward the inner cable 20b. When the cam 9a is rotated together with the first leg 5 with respect to the seat cushion 2, the curved surface 9a1 pushes the inner cable 20b to curve the inner cable 20b. That is, the curved surface 9a1 increases the amount by which the inner cable 20b is pulled.

Figure 5:
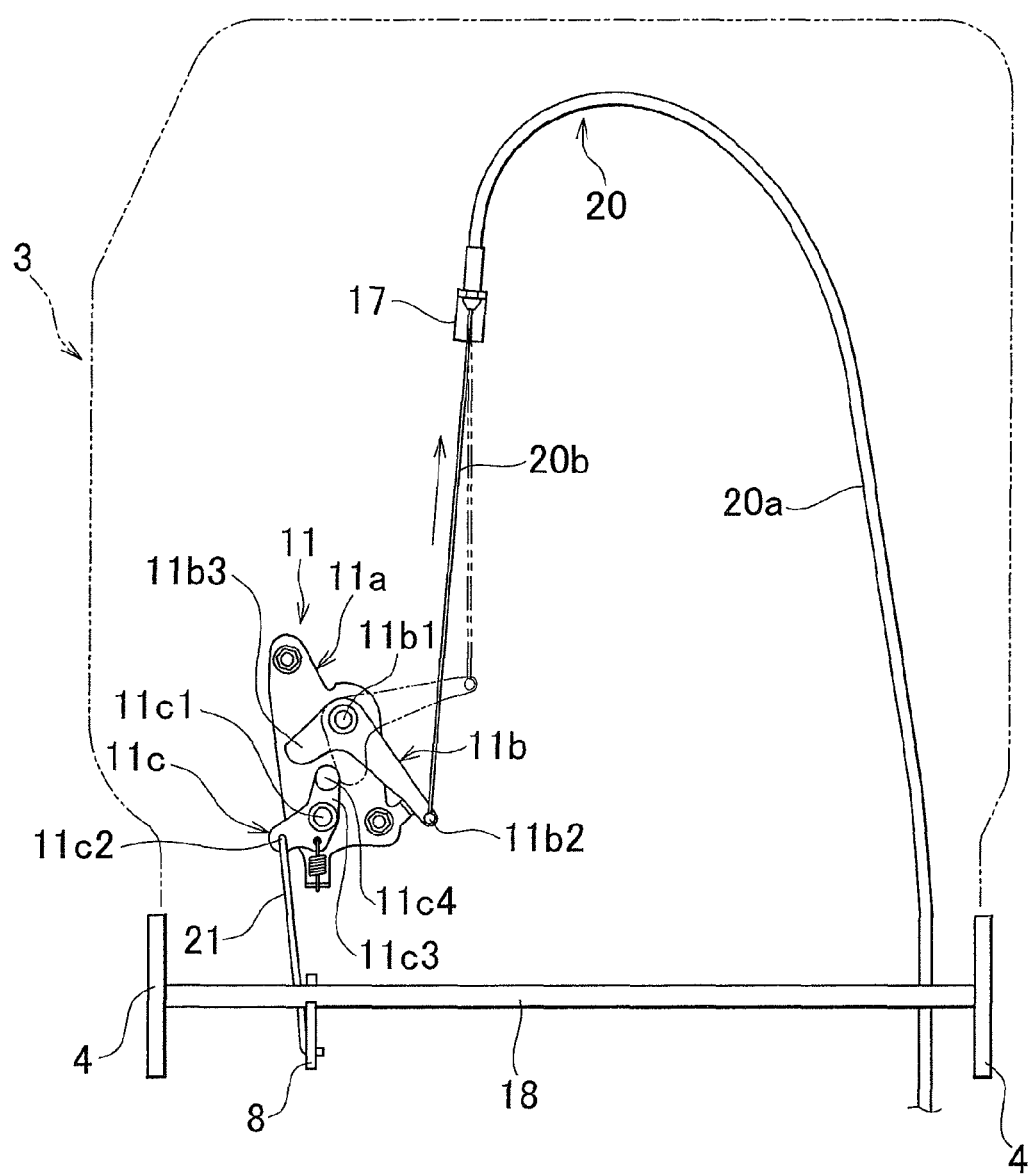
FIG. 5 is a front view of a restriction device and a seat back.

As shown in FIGS. 4 and 5, the cable 20 is disposed in the seat cushion 2 and the seat back 3. The cable 20 includes an outer cable 20a and the inner cable 20b inserted through the outer cable 20a. As shown in FIG. 4, one end of the outer cable 20a is mounted to a bracket 16 provided in the seat cushion 2. One end of the inner cable 20b is connected to the cam 9a. As shown in FIG. 5, the other end of the outer cable 20a is attached to a bracket 17 fixed to the seat back 3. The other end of the inner cable 20b is attached to a restriction device 11.

Figure 6:
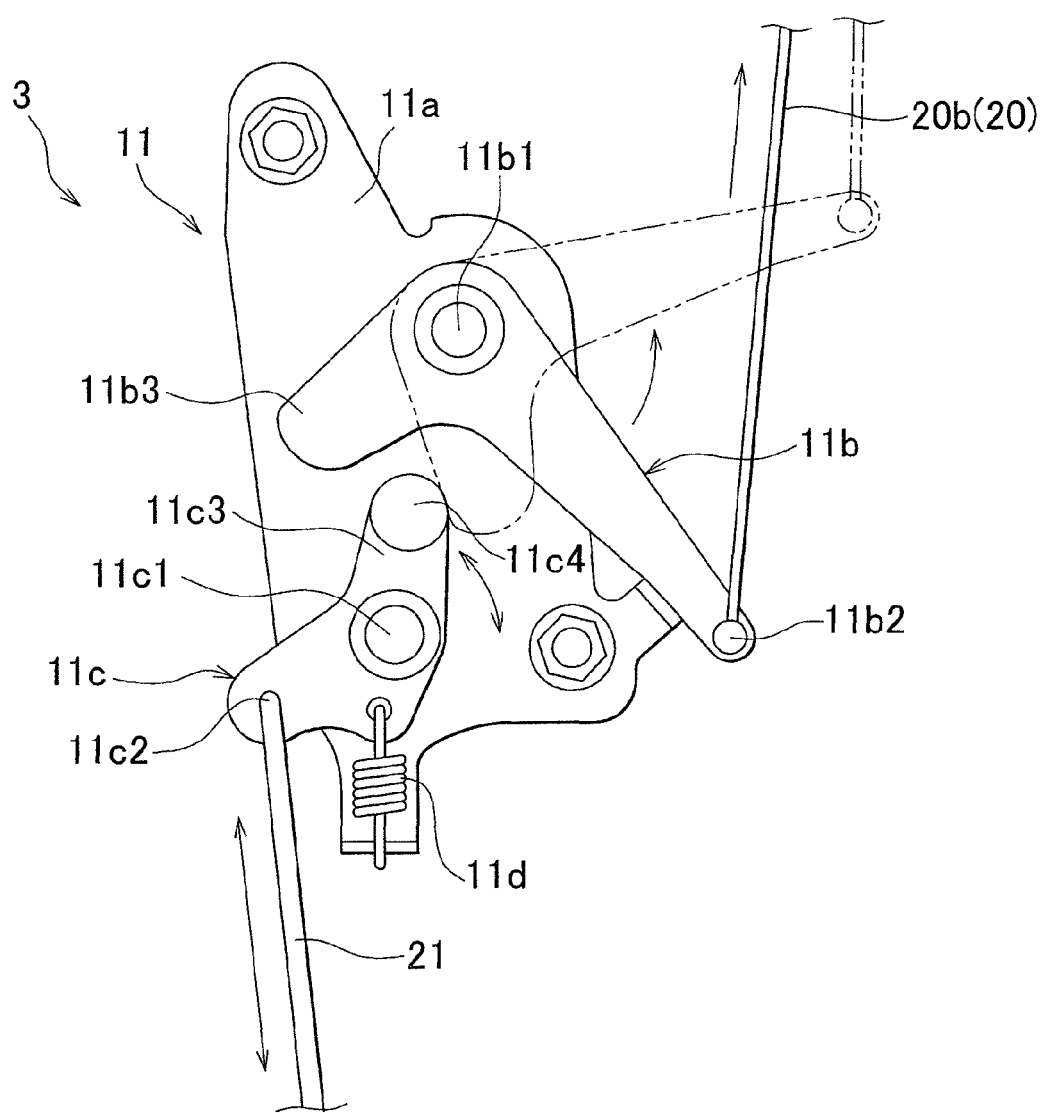
FIG. 6 is an enlarged front view of the restriction device.

As shown in FIGS. 5 and 6, the restriction device 11 restricts the stroke amount of the cable 21 to a specified amount or less, and includes a base 11a, a first lever 11b, and a second lever 11c. The base 11a is attached to the seat back 3. The first lever 11b includes an attachment portion 11b1 that is rotatably attached to the base 11a, a coupling portion 11b2 to which the inner cable 20b is coupled, and a projection portion 11b3 that projects toward the second lever 11c. The second lever 11c includes an attachment portion 11c1 that is rotatably attached to the base 11a, a coupling portion 11c2 to which the cable 21 is coupled, a projection portion 11c3 that projects toward the first lever 11b, and a pin 11c4 that extends upright from the projection portion 11c3.

Figure 2:
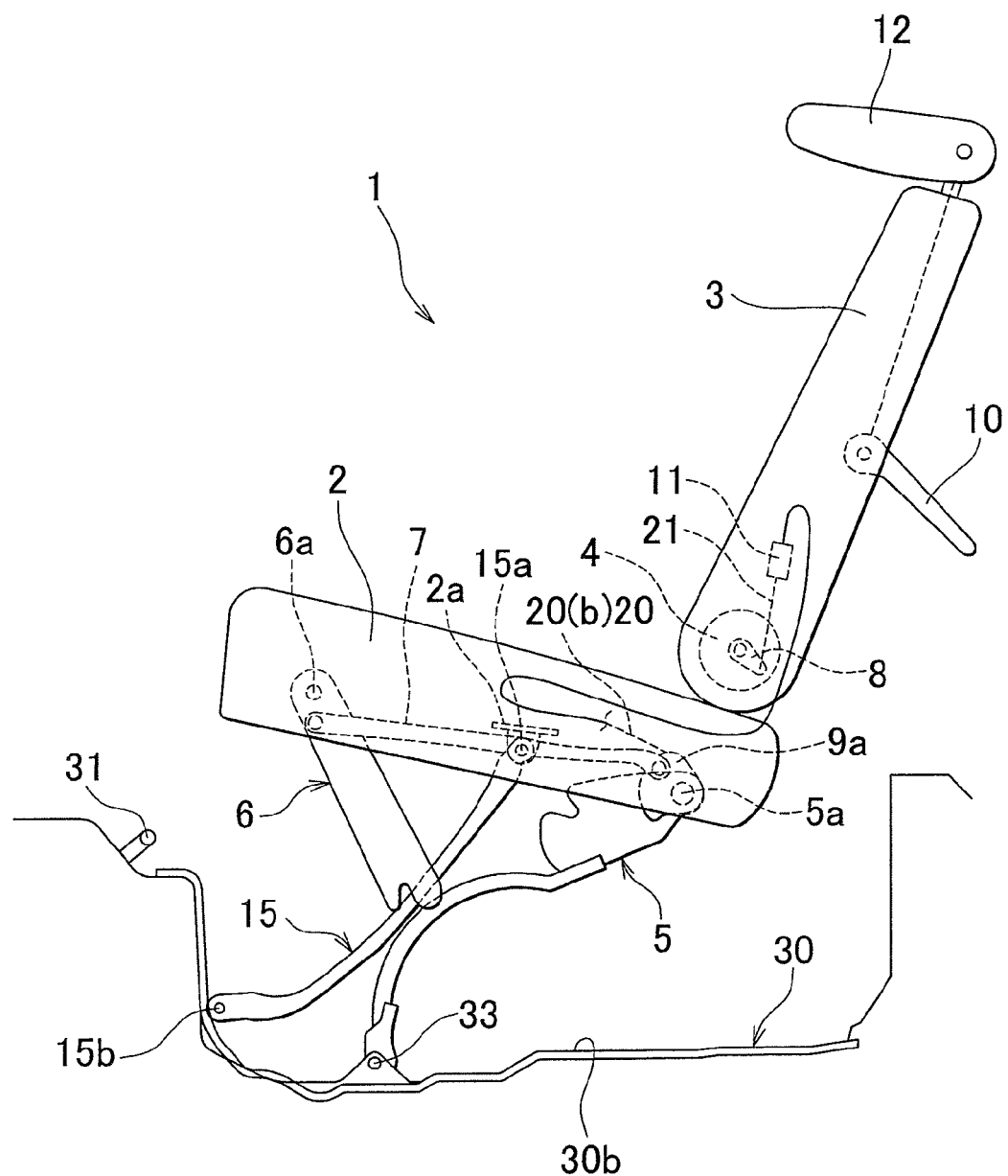
FIG. 2 is a left side view of the seat as it is being retracted.

If the operation lever 10 is operated as shown in FIG. 2, the first leg 5 is rotated rearward from the use position toward the retracted position, the first leg 5 and the cam 9a rotate clockwise with respect to the seat cushion 2. This causes the cam 9a to pull the inner cable 20b, which causes the inner cable 20b to pull the first lever 11b as shown in FIG. 6. Then, the first lever 11b is rotated counterclockwise, the projection portion 11b3 pushes the pin 11c4, the second lever 11c is rotated clockwise, and the second lever 11c pulls the cable 21.

As shown in FIGS. 2 and 5, the cable 21 is coupled to a release lever 8. The release lever 8 is attached to a rod 18 so that the release lever 8 cannot rotate with respect to the rod 18. Thus, when the cable 21 rotates the release lever 8, which in turn rotates the rod 18, the reclining device 4 provided at each end of the rod 18 is unlocked by the rod 18. Thereby allowing the seat back 3 to be folded over the seat cushion 2.

If the inner cable 20b is pulled by a specified amount or more as shown in FIG. 6, the projection portion 11b3 rotates counterclockwise beyond the pin 11c4 as indicated by the phantom line. This causes the second lever 11c to return to its initial position through a spring 11d, which releases a force that pulls the cable 21.

When the first leg 5 is rotated, as shown in FIG. 2, the second leg 6 is rotated counterclockwise with respect to the seat cushion 2 through the interlocking member 7. This causes the second leg 6 to rotate from the use position, in which the second leg 6 stands upright with respect to the seat cushion 2, to a retracted position at which the second leg 6 extends along the seat cushion 2. In this way, the seat 1 is retracted in the recessed portion 30b as shown in FIG. 3.

The seat 1 is formed as described above. That is, as shown in FIGS. 1 and 4, the release device 9, which pulls a cable (inner cable 20b) to unlock the reclining device 4 when rotation of the first leg 5 with respect to the seat cushion 2 is detected, is provided at the proximal end 5a of the first leg 5.

Thus, the release device 9 pulls the inner cable 20b in accordance with the amount of rotation of the first leg 5 with respect to the seat cushion 2, not via the interlocking member 7 or the second leg 6. Therefore, the release device 9 reliably releases the reclining device 4 through the inner cable 20b without being affected by variations in size of the interlocking member 7 and the second leg 6 or variations in assembled position of such components. In addition, because the release device 9 is provided at the proximal end 5a of the first leg 5, the release device 9 may be positioned closer to the reclining device 4 than when the release device 9 is provided at the distal end 5b. Therefore, the length of the cable that couples the release device 9 and the reclining device 4 may be reduced.

As shown in FIG. 4, the release device 9 includes the cam 9a, which is secured to the proximal end 5a of the first leg 5. The curved surface 9a1, which curves the cable (inner cable 20b) when the first leg 5 is rotated with respect to the seat cushion 2. Thus, when the first leg 5 is rotated with respect to the seat cushion 2, the cam 9a curves the inner cable 20b. This increases the stroke amount by which the release device 9 pulls the inner cable 20b by the length of the curved surface 9a1 of the cam 9a. In this way, the reclining device 4 can be reliably unlocked.

As shown in FIGS. 1 and 5, the restriction device 11, which restricts the stroke amount by which the cable 21 pulls the release lever 8, is provided between the release device 9 and the reclining device 4. Thus, the release lever 8 may be prevented from being pulled significantly, which reduces the possibility of damage to the reclining device 4 and so forth.

The present invention is not restricted to the above embodiment, and may also be implemented in the following ways. In FIG. 1, the first leg 5 is shown as being rotatably attached to the vehicle floor 30. However, the first leg may instead be rotatably attached to a pillar, the ceiling, or the like of a vehicle so that the seat cushion retracted along the pillar, the ceiling, or the like. In addition, although the first leg 5 is shown attached to the rear of the seat cushion 2, and the second leg 6 is shown attached to the front of the seat cushion 2 in FIG. 1. The first leg may instead be provided at the front or along one side of the seat cushion and the second leg may be provided at the rear or the opposite side portion of the seat cushion so that the seat cushion may be retracted in front of or to one side of the use position. In another alternative, instead of employing a link member as the interlocking member 7 for the seat 1, a cable may be used as the interlocking member 7 to couple the first leg 5 to the second leg 6 and an urging member that urges the second leg 6 to the use position. Although the release device 9 includes the cam 9a, which is attached to the first leg 5 so that the cam 9a cannot rotate with respect to the first leg 5 as shown in FIG. 4, the release device may instead include a gear that is rotatably attached to the seat cushion. Teeth may then be formed on the first leg to mesh with the gear so that the cable is pulled by rotating the gear. A final example modification includes, substituting the cam 9a of the release device 9 with a pole that extends from the first leg 5, and coupling the inner cable 20b to an end of the pole instead.

What is claimed is:

1. A retractable seat for a vehicle, the retractable seat comprising:
    a seat back that is rotatably attached to a seat cushion;
    a reclining device that locks reclining position of the seat back with respect to the seat cushion;
    a first leg having a proximal end rotatably attached to the seat cushion and a distal end rotatably attached with a first locking member to a main body of the vehicle;
    a second leg having a proximal end rotatably attached to the seat cushion and a distal end rotatably attached with a second locking member to the main body of the vehicle;
    a lever that is mounted to the seat back and configured to unlock the first locking member and the second locking member;
    an interlock member that couples the first leg to the second leg so that the second leg is moved in accordance with a movement of the first leg; and
    a release device that is provided at the proximal end of the first leg to unlock the reclining device,
    wherein the release device includes a cam that is secured to the proximal end of the first leg, the cam having a curved surface that contacts and curves the cable when the first leg is rotated with respect to the seat cushion,
    wherein when the lever is operated, the first leg and the second leg are unlocked, the first leg is rotated with respect to the main body of the vehicle so that the seat cushion moves from a use position to a retracted position, and the second leg is rotated, via the interlocking member, from a use position with respect to the seat cushion to a position where the second leg extends along the seat cushion, and
    wherein when the release device detects the rotation of the first leg with respect to the seat cushion, the release device pulls a cable to unlock the reclining device.

2. The retractable seat according to claim 1,
    wherein a portion of the curved surface of the cam, at which the cable and the cam contact each other when the first leg is rotated, protrudes outwardly in a direction toward the cable so as to support a lower side of the cable.

* * * * *